United States Patent
Lieberman et al.

(10) Patent No.: US 11,086,842 B1
(45) Date of Patent: Aug. 10, 2021

(54) HIGHLY SCALABLE AND CONSISTENT PLUGGABLE MESSAGING SYSTEM

(71) Applicant: EMC IP Holding Company LLC, Hopkinton, MA (US)

(72) Inventors: Amit Lieberman, Raanana (IL); Jehuda Shemer, Kfar Saba (IL); Assaf Natanzon, Tel Aviv (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 593 days.

(21) Appl. No.: 15/197,840

(22) Filed: Jun. 30, 2016

(51) Int. Cl.
- *G06F 16/23* (2019.01)
- *G06F 16/21* (2019.01)
- *H04L 12/58* (2006.01)

(52) U.S. Cl.
CPC ........ *G06F 16/2365* (2019.01); *G06F 16/211* (2019.01); *H04L 51/046* (2013.01)

(58) Field of Classification Search
CPC ......... G06F 17/30227; G06F 17/30353; G06F 17/30371; G06F 17/30575; G06F 17/30581; G06F 17/30864; G06F 17/30377; G06F 16/2471; G06F 9/466; G06F 16/00; G06F 9/44526; G06F 16/2365; G06F 16/211; H04L 51/046
See application file for complete search history.

(56) References Cited

U.S. PATENT DOCUMENTS

| | | | |
|---|---|---|---|
| 8,751,460 B1 * | 6/2014 | Annapragada | G06F 16/90335 707/684 |
| 2002/0013846 A1 * | 1/2002 | Vuong | H04L 41/046 709/226 |
| 2002/0174108 A1 * | 11/2002 | Cotner | G06F 11/1474 |
| 2003/0153302 A1 * | 8/2003 | Lewis | H04L 51/12 455/412.1 |
| 2005/0004888 A1 * | 1/2005 | McCrady | G06Q 10/10 |
| 2005/0038835 A1 * | 2/2005 | Chidambaran | G06F 9/466 |
| 2012/0005241 A1 * | 1/2012 | Ortel | G06F 16/212 707/803 |
| 2012/0330954 A1 * | 12/2012 | Sivasubramanian | H04L 67/02 707/737 |
| 2013/0196744 A1 * | 8/2013 | Earley | G07F 17/3255 463/25 |
| 2015/0229538 A1 * | 8/2015 | Burke | H04L 47/76 709/225 |
| 2016/0241403 A1 * | 8/2016 | Lindemann | H04L 63/0861 |
| 2016/0321051 A1 * | 11/2016 | Austel | H04L 67/025 |
| 2017/0132584 A1 * | 5/2017 | Birukov | G06Q 50/12 |

* cited by examiner

*Primary Examiner* — Mariela Reyes
*Assistant Examiner* — Fatima P Mina
(74) *Attorney, Agent, or Firm* — Staniford Tomita LLP (57) ABSTRACT

A plugin is provided to a service that includes a database for storing data corresponding to transactions received by the service and applied to the database. Upon receipt of a transaction to be performed by the service, the plugin receives a message generated by the service and associated with informing another service of the transaction. The message is stored in the database together with the transaction, the message and transaction thereby being in the same transactional context. Upon the transaction being committed, the message is also processed because the transaction and message are in the same single transactional context within the database.

17 Claims, 4 Drawing Sheets

HIGHLY SCALABLE AND CONSISTENT PLUGGABLE MESSAGING SYSTEM

TECHNICAL FIELD

Embodiments are generally directed to communications in a distributed services computing environment.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

The development of modern applications relies on multiple distributed services which communicate and coordinate by exchanging messages through a messaging system. Many distributed computing systems use a two-phase commit ("2pc") protocol to communicate. The two-phase commit protocol helps to ensure consistent states and integrity in a distributed application. In the protocol, there are at least two entities where at least one of the entities depends on the processing by the other. Prior to the processing, one of the entities sends a message to the other. The sender waits for an acknowledgment of the message before performing the processing. The acknowledgement provides a guarantee that the message has been sent.

A problem with 2pc is the overhead that accompanies the message sending and receiving processes. The problem is compounded when the distributed system includes multiple data services such as a database and messaging system. These are two different resources and thus do not participate in the same transaction. For example, there may be an operation to be applied to the database and a message to be sent regarding the operation. It is important that both actions either happen or neither action happens so that the system does not enter an inconsistent state where, for example, the operation is committed to the database but the message is not sent. While a two-phase commit can be used, it has a significant impact on the throughput of the application.

Therefore, there is a need for improved systems and techniques to handle messaging in a distributed application architecture.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for utilizing an existing service resource such as a relational database management system (RDBMS) databases to implement a consistent and scalable messaging system that removes the need for expensive coordination protocols such as two-phase commit to achieve database-messaging data integrity. Some embodiments of the invention involve a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
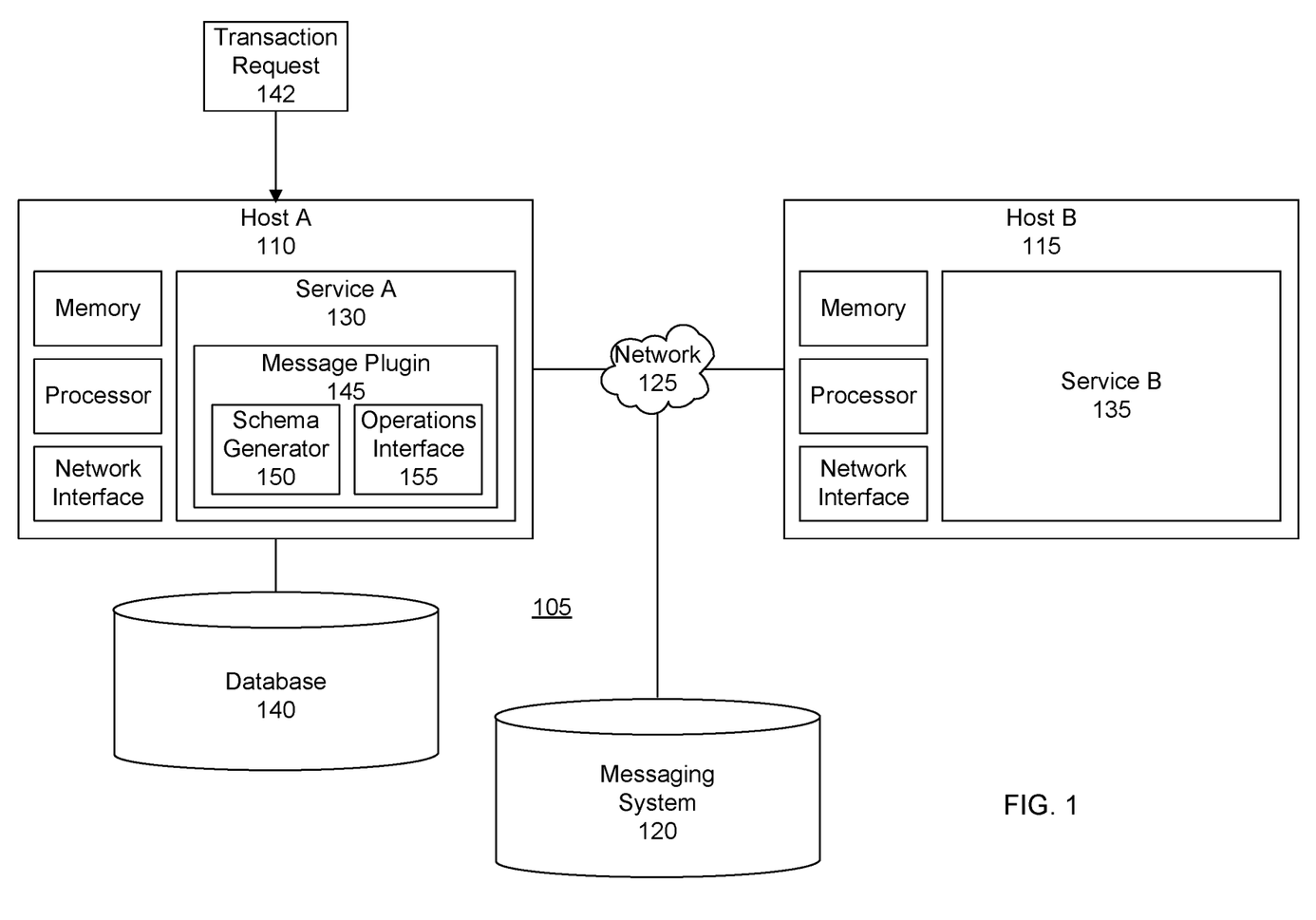
FIG. 1 shows a block diagram of a distributed computing environment in which a pluggable messaging system may be implemented, under some embodiments.

FIG. 1 shows a block diagram of a distributed network environment 105 in which a pluggable messaging system may be implemented. In the example shown in FIG. 1, there is a first host A 110, a second host B 115, and a messaging system 120, each of which are interconnected by a network 125. First host A hosts a first service A 130 and second host B hosts a second service B 135. Although the services are shown as being hosted by separate hosts or nodes it should be appreciated that the services may be hosted by the same host. First service A connects to a database 140. The database stores data corresponding to transactions or requests 142 received and processed by the service.

In an embodiment, at least one of the services (e.g., first service A) is provided with a messaging plugin 145. The plugin may be embedded with the service. A plugin is an add-on component that may be installed onto the service. The plugin handles messages associated with the service by storing the messages in or on top of the existing database connected to the service rather than in separate messaging system 120. The storing of the messages in the database of the service reduces the need for a complex two-phase commit (2pc) protocol involving the database and messaging system.

The network may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server. The network is representative of many different environments including a LAN (local area network) system, a wide area network (WAN) system, an Internet system, Ethernet, computer network, intranet, cellular phone network, or other.

The hosts may be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

In an embodiment, the services are referred to as micro-services. The services may form parts of an overall web service for a website or web application. The micro-service architecture refers to developing an application as a suite of small services, each running its own process and communicating with lightweight mechanisms (e.g., an HTTP resource application programming interface (API)). Each micro-service may be located on an individually addressable host or node in the network. In a micro-services architecture each element of functionality may be placed into a separate service. In other words, each service or micro-service may execute a particular function. Two or more different services may cooperate, coordinate, or function interactively to provide a single web service. Scaling can be achieved by identifying which specific micro-services are particularly loaded and distributing additional instances of these services across existing host servers, new host servers, or both. This is in contrast to monolithic applications in which all functionality may be placed into a single process and scaling is achieved by replicating the entire monolith across multiple servers. Further, micro-services can be independently or separately deployable. This allows a particular service to be upgraded without having to redeploy the entire application.

The type of data stored in the database varies greatly depending upon the type of service provided. For example, the services may be part of a web service for a financial website or web application. Each service may be responsible for a particular function of the site. These functions may include executing stock trades, account balance notifications (e.g., email notifications or text message notifications), bill payments, and many others. In particular, a service may be responsible for processing transfers of money from one account to another account; and a database connected to the service may store the balances for each account. Upon the service processing a transaction, the database is updated to reflect the new account balances (e.g., a debit in one account and a credit in another account).

As another example, the services may be part of a web service for an e-commerce site. One service may be responsible for searching the site in response to a user query for a particular item (e.g., "New Balance 998 sneaker," or "Huggies Little Snugglers diapers"). Another service may be responsible for providing recommendations based on items that were previously purchased. Another service may be responsible for emailing order confirmations. Another service may be responsible for processing an order to purchase the items, and so forth. In this example, a database connected to the order processing service may store an order number, an identification of the items associated with the order, cost of each item, shipping costs, and so forth.

In modern distributed applications, communicating between application services via some sort of messaging system is an efficient and highly adopted pattern. Messaging software implementing the standard API Advanced Message Queuing Protocol (AMQP) (such as RabbitMQ) is being used by business critical applications in order to transport business information asynchronously. AMQP is an open standard for passing business messages between applications or organizations. Since the messaging technologies can be used in critical applications transactional protocols are desirable to ensure data consistency. For example, being able to send a message within a transaction and commit only if the full operation succeeded (and or roll back otherwise) is a desirable feature. Since the application state is being distributed across multiple data sources, (e.g., a database, persistent messages) there is a need for supporting a 2-phase commit protocol between messaging software and other databases. There are standards to support this behavior (for example Java EE Connector Architecture (JCA) in Java 2 Platform Enterprise Edition (j2ee)) and also implementations (e.g., RabbitMq XA coordinator for j2ee).

One example for the 2pc requirement includes: a service receives a message, creates a change in a database, and then sends acknowledgment that the message has been processed. If the application has failed sending the acknowledgment we expect the database to roll-back to its original state from before processing the message, since the entire "operation" has failed.

While the messaging software solutions may be scalable and feature rich in highly distributed applications written in a micro-service architecture, it has been demonstrated in various benchmarks that the 2pc protocol is creating a huge bottleneck of up to 50 percent in the throughput. Recommended solutions have included changing the application code and introducing idempotent services or using the 2pc protocol and accepting the performance degradation at scale. There is a significant bottleneck on overall system throughput due to the coordination protocol overhead when deploying both database and messaging systems and coordinating using 2 phase commit protocols in distributed systems.

To address these problems, an embodiment of the system includes implementing the AMQP messaging protocol on top of a given database that is already being used by the service. This provides for eliminating the need for a complex 2 phase commit protocol of two databases since the transaction could be local to the database running the software (e.g., service). Consider, as an example, the classic "two generals' problem" often use to describe such protocols like 2pc. In an embodiment, using the "two generals' problem" as an analogy, systems and techniques are provided for only one general for both armies.

In a specific embodiment, the plugin is embedded within the service that is the receiver of the messages and "piggy backs" on the database connection introduced by the service to implement the AMQP protocol. On startup, the plugin creates a schema in the database for storing the messages and metadata. A table will store the messages' metadata (queue name, message headers, state, and so forth) and messages' contents is stored as blobs.

Upon receiving a message, the plugin stores the message content in the database and any further actions done by the service on the database are performed within the same transactional context. Once a database transaction is committed, the update to the message state as being acknowledged is committed as well.

The message receiver is invoked using a database trigger that triggers once the messages table is populated.

The above technique helps to eliminate the need for a 2pc (two phase commit) between the messaging and database (DB) of a given service, which in most cases is the majority of use cases of a 2pc protocol in a distributed application. In cases where there is a requirement to coordinate a complex workflow transaction (tx) that involves more than two RDBMS databases (which is relatively rare)—then aspects of the 2pc protocol may be implemented. Even so, however, the plugin will still greatly reduce the complexity by reducing by half the components participating in such a complex coordination protocol.

Some advantages of the plugin and associated techniques include a faster application, better scaling, fewer resources to manage and purchase, and support for backing up messages consistent with the database state. Below are some further advantages:

1) A resolution of the scale and performance issues caused by the heavyweight 2pc protocol.

2) Once a customer backs up/replicates the service's database, the customer also receives the backup for the messaging itself. Once the database is restored to a specific point in time, the messages will also be consistent with the application.

3) No need to manage two external pieces of software (i.e., database and messaging). Concentrating on the database only reduces dependency and hence maintenance and other time consuming issues.

Referring now to FIG. 1, in an embodiment, the plugin includes several modules including a schema generator 150, and an operations interface 155. The schema generator is responsible for creating the schema in the database for storing the messages and metadata. A schema provides a definition of a database table. The schema defines the structure and the type of contents that each data element within the data structure can contain. The schema defines the structure of a database system and may be described in a formal language supported by the database management system (DBMS). In a relational database, the schema defines the tables, the fields in each table, the relationships between fields and tables, and the type of content that each field may contain. For example, the schema for a structure that includes a table defines the size of a column in the table and the type of data in the column. The schema is generally stored in the database management system's system database, catalog, or data dictionary. The operations interface is responsible for establishing a communication path with the database used by the service and performing operations on the database such as storing the messages and metadata.

It should be appreciated that the modules shown in FIG. 1 can be functional entities that may be found in the plugin and implementation of the functions may vary. In other embodiments the functions of the plugin may be divided or combined into other units or code components.

Figure 2:
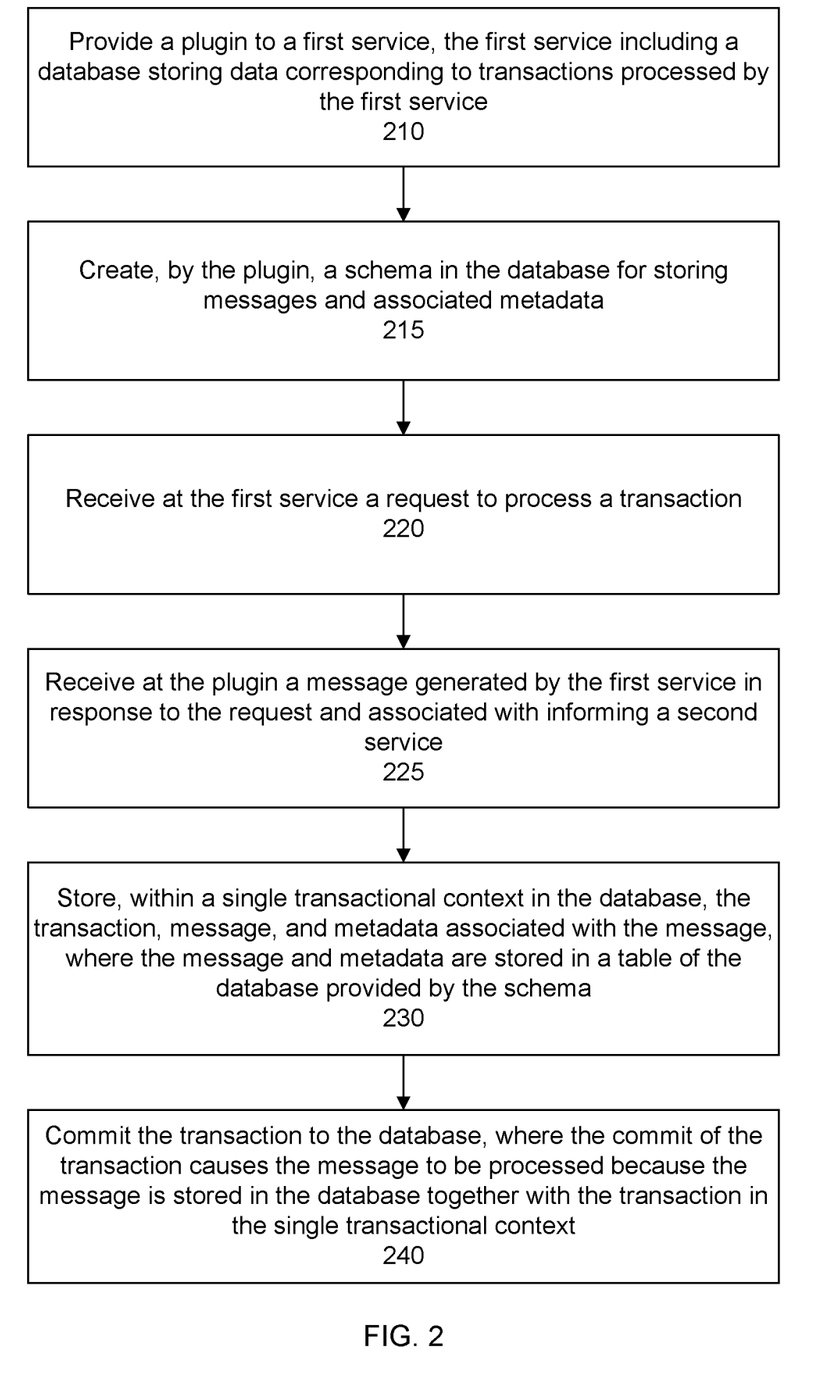
FIG. 2 shows a flow of a process for the pluggable messaging system, under some embodiments.

FIG. 2 shows an overall flow of a process for a scalable and consistent pluggable messaging implementation according to an embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Figure 3:
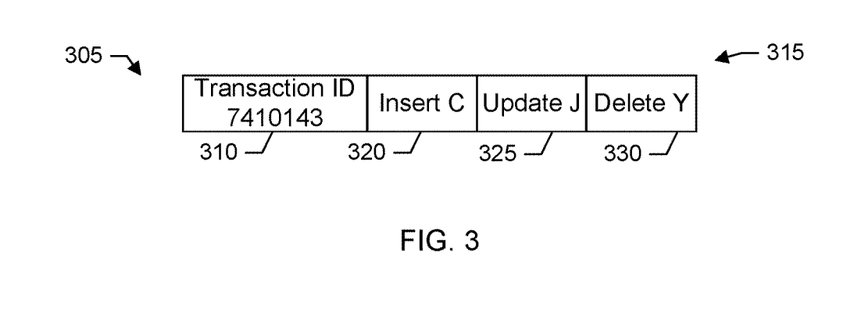
FIG. 3 shows an example of a transaction to be applied to a database.

In a step 210, a plugin is provided to a first service, where the first service includes a database for storing data corresponding to transactions requested to be processed by the first service. FIG. 3 shows an example of a transaction 305. The transaction includes a transaction identifier (ID) 310 and one or more operations, actions, changes, or SQL statements or expressions 315 to be committed against the database.

The transaction identifier (ID) is a unique identifier that may be assigned to every transaction. The transaction identifier may be included in log records written by the database engine during various operations (e.g., "INSERT," "UPDATE," "DELETE," and so forth) of a transaction. The transaction ID allows a transaction to be tracked and can be used to guarantee the atomicity, consistency, isolation, and durability of a database transaction.

In many cases, a transaction will include multiple operations to be processed or applied (e.g., two or more operations). In the example shown in FIG. 3, the transaction includes a first operation 320 ("insert C"), a second operation 325 ("update J"), and a third operation 330 ("delete Y"). It is desirable that the operations either be all completed or none completed (all rolled back) to maintain data consistency and integrity.

For example, a transaction request from a user or application may request a transfer of Y amount between two accounts. The transaction request may include a first operation to debit a first account by Y, and a second operation to credit a second account by Y. It is desirable that if all operations cannot be completed then no operations be completed. Specifically, it would be problematic if the first account was debited by Y, but the second account was not credited by Y. Conversely, it would be problematic if the first account was not debited by Y, but the second account was credited by Y.

Referring back now to FIG. 2, in a step 215, the plugin creates a schema in the database for storing messages and metadata associated with the messages. In an embodiment, a message may be sent by the first service to indicate completion of the transaction. It is desirable that both the requested transaction and processing or sending of the message occur (or neither occurs) because of other services (e.g., a second service) that may depend on the first service or database updated by the first service.

For example, the second service may include an overdraft protection service that is triggered when an account does not have sufficient funds to cover a purchase. It would be problematic, if the transaction completed but the sending of the message failed because the overdraft protection service would not be triggered. Conversely, it would be problematic if the transaction did not complete but the sending of the message did occur because the overdraft protection service would be triggered even though it was not needed. Thus, in order to maintain a consistent state it is desirable that both actions occur (e.g., there is acknowledgment of both the database transaction and message sending) or neither actions occur.

In a step 220, the first service receives a request to process a transaction. In a step 225, the plugin receives a message generated by the first service in response to the request and associated with informing a second service of the transaction. In a step 230, the plugin stores the message and associated metadata in a table of the database provided by the schema. In other words, both the transaction and message (including message metadata) are stored in the same database. The transaction, message, and associated metadata are stored within a single transactional context in the same database. For example, the transaction, message, and message metadata may be assigned the same transaction ID.

Figure 4:
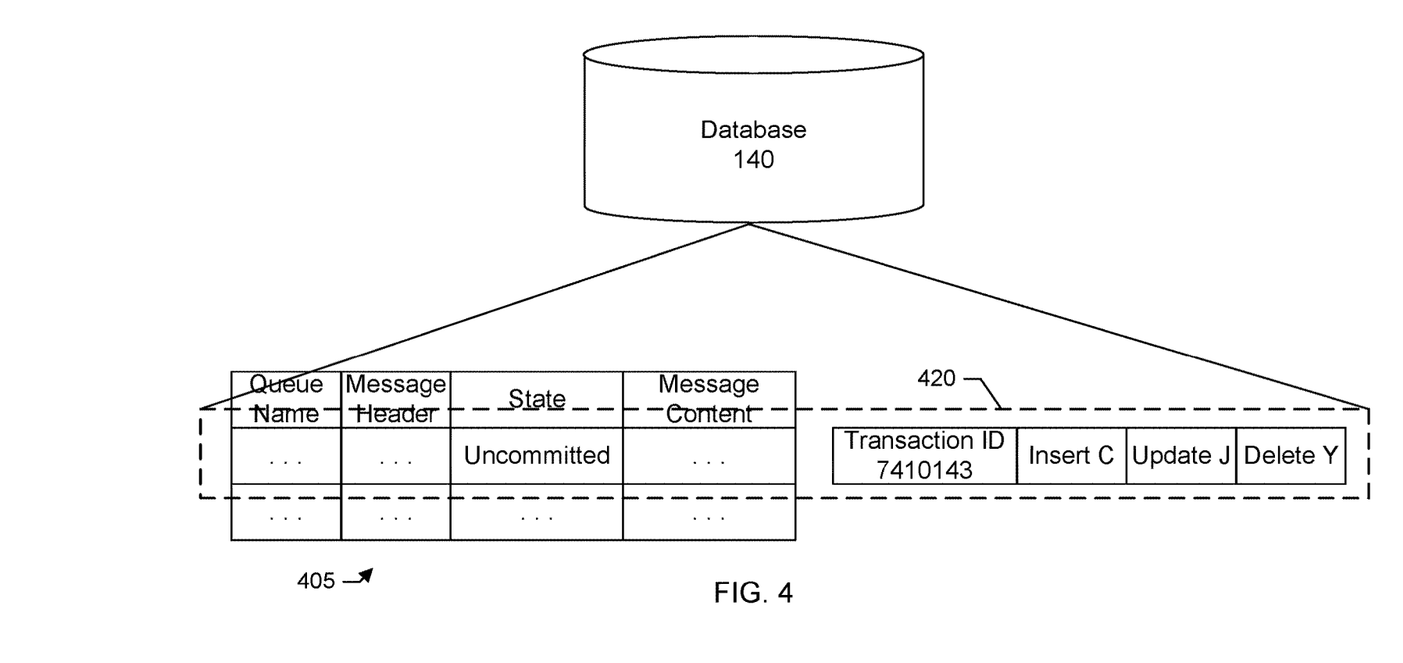
FIG. 4 shows a block diagram of a single transactional context in the database that includes the transaction and message, according to a specific embodiment.

FIG. 4 shows a block diagram for the database of the given service in a first state. As shown in the example of FIG. 4, there is a message table 405 in the database based on the schema created by the plugin. The message table includes a first column storing a queue name, a second column storing message header information, a third column storing a message state, and a fourth column storing message content. The message is associated with the various operations of the transaction (e.g., "insert C," "update J," and "delete Y") in a same transactional context 420 within the database. The plugin may add to the requested transaction received by the service operations associated with processing the message. This allows the message operations and operations of the requested transaction to be combined or handled as a single transaction within the database of the given service, rather than as two separate transactions involving a separate messaging system.

Referring back now to FIG. 2, in a step 240, the transaction is committed to the database. The commit of the transaction causes the message to be processed because the message is stored in the database together with the transaction in the same single transactional context. In an embodiment, the processing of the message includes updating a state of the message from uncommitted to acknowledged. In an embodiment, the message receiver is invoked using a database trigger of the database that triggers once the message table is populated. In an embodiment, the message may be stored in a temporary table or staging region of the database. As part of committing the transaction, the message may be placed in the final message destination table where a database trigger is fired. A trigger action may include transmitting a message associated with the transaction. The message may indicate a completion of the transaction.

Figure 5:
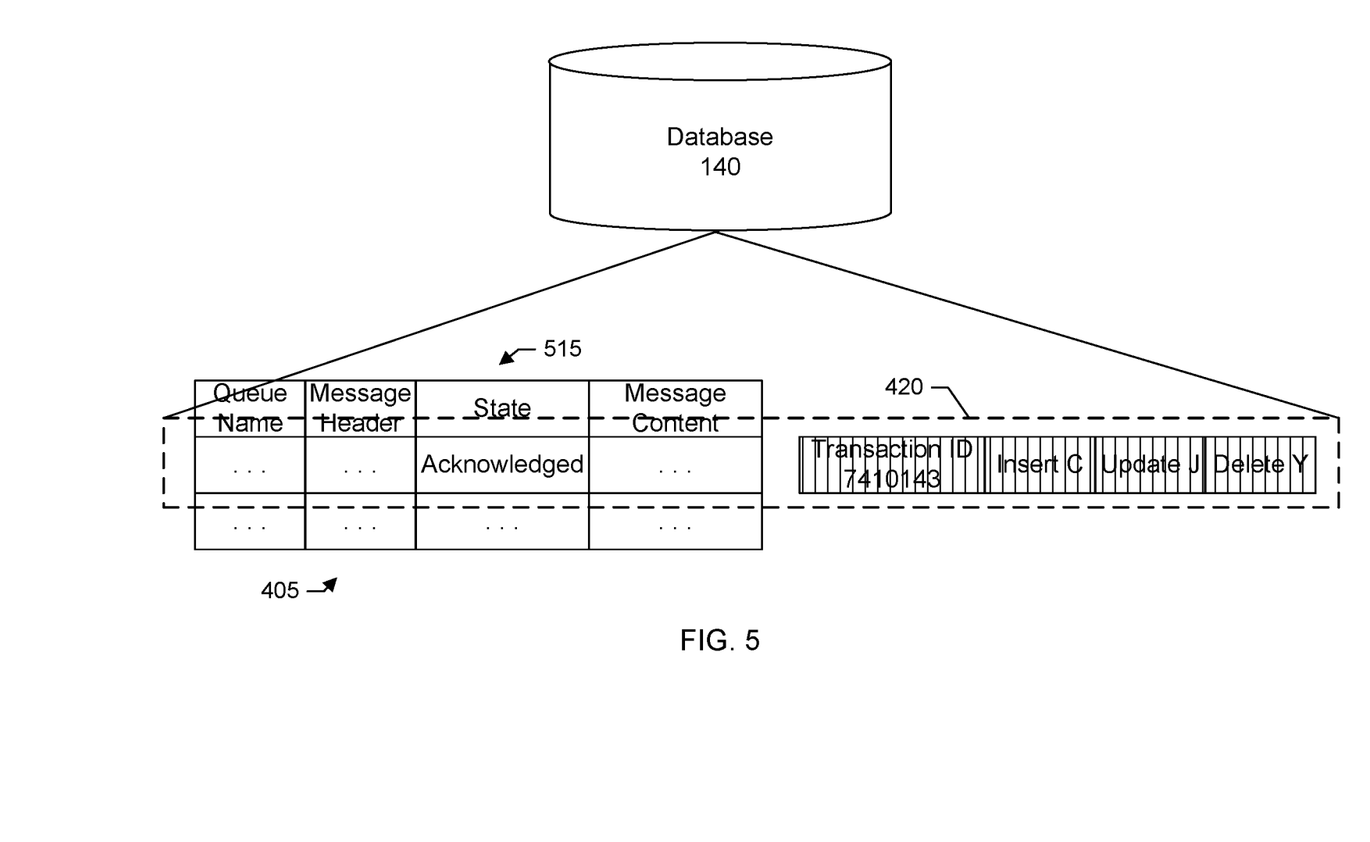
FIG. 5 shows the single transactional context having been applied according to an embodiment.

FIG. 5 shows a second state of the database shown in FIG. 4. As shown in FIG. 5, a state 515 of the message in the message table has been updated to "acknowledged" as part of the database transaction being committed. In FIG. 5, the operations of the transaction are shown with a background pattern of vertical lines to indicate that the operations have been committed or applied to the database.

The commit of the transaction may be accompanied by a message sent by the first service to other services (e.g., second service) that may be listening. The message may be passed to a message bus so that other services listing for bus messages may receive the message from the message bus.

The database may include a transaction log or journal that provides a temporary staging area for writes (e.g., transactions) before the writes are applied to the database. In an embodiment, the transaction log of the database may include writes for the transaction, message, and associated metadata. The writes may be associated with the same transaction identifier. Table A below shows an example of a transaction log for the database.

TABLE A

| Transaction ID | Operation |
|---|---|
| 7410413 | Update account balance table |
| 7410413 | Update message table |
| 7410413 | . . . |

A first column of the table lists the transaction ID. A second column of the table lists the operation performed on the database. As shown in the example of table A above, a transaction log (or committed transaction log) of the database may include an indication that both the transaction and message were written to the database as part of the same transaction ID (e.g., "7410413").

As discussed, the traditional 2pc protocol to manage and coordinate commits against a database of a given service with a separate messaging system in a distributed application or micro-service architecture has a very high overhead because of the volume of messages exchanged between the sending and receiving processes. Storing and maintaining the messages using the database of the given service rather than in a separate messaging database, however, eliminates the need for the complex 2pc protocol. The message plugin eliminates the need to coordinate between two different databases or entities because messages and requested operations are both stored in the same database using the same transaction and committed using a single transaction. The database is aware of the message because it is stored in the database and thus the database processes or commits the entire transaction (including the message) or rolls back the entire transaction. An operation to process the message may be added to the transaction requested to be processed by the service. This allows the operations of the transaction (including the operation to process the message) to be processed as an atomic transaction.

In a specific embodiment, a method includes providing a plugin to a service, the service comprising a database for storing data corresponding to transactions received by the service and applied to the database; upon receipt of a transaction to be performed by the service, receiving, by the plugin, a message generated by the service and associated with informing another service of the transaction; and adding to the transaction an operation to process the message, wherein upon the transaction being committed to the database, the operation to process the message is also executed because the operation was added to the transaction. The processing may include sending the message to another service. The processing may include sending the message to a message bus.

In a specific embodiment, a method includes providing a plugin to a service, the service comprising a database for storing data corresponding to transactions received by the service and applied to the database; upon receipt of a transaction to be performed by the service, receiving, by the plugin, a message generated by the service and associated with informing another service of the transaction; and storing the message in the database together with the transaction, the message and the transaction thereby being in a same single transactional context within the database, wherein upon the transaction being committed to the database, the message is also processed because the transaction and message are in the same single transactional context within the database.

The method may include creating, by the plugin, a schema in the database for storing messages, generated by the service, and metadata associated with the messages, and wherein the storing the message in the database comprises storing the message and metadata associated with the message in a table provided by the schema. The transaction to be committed to the database and the message may be assigned the same transaction identifier. The method may include adding to the transaction an operation to process the message.

In an embodiment, upon the transaction not being committed to the database, the message is also not processed because the transaction and the message are in the same single transactional context within the database.

In another specific embodiment, there is a system for a highly scalable and consistent pluggable messaging system on top of an existing database, the system comprising: a processor-based system executed on a computer system and configured to: provide a plugin to a service, the service comprising the existing database for storing data corresponding to transactions received by the service and applied to the existing database; upon receipt of a transaction to be performed by the service, receive, by the plugin, a message generated by the service and associated with informing another service of the transaction; and store the message in the database together with the transaction, the message and the transaction thereby being in a same single transactional context within the database, wherein upon the transaction being committed to the database, the message is also processed because the transaction and message are in the same single transactional context within the database.

In another specific embodiment, there is a computer program product, comprising a non-transitory computer-readable medium having a computer-readable program code embodied therein, the computer-readable program code adapted to be executed by one or more processors to implement a method comprising: providing a plugin to a service, the service comprising a database for storing data corresponding to transactions received by the service and applied to the database; upon receipt of a transaction to be performed by the service, receiving, by the plugin, a message generated by the service and associated with informing another service of the transaction; and storing the message in the database together with the transaction, the message and the transaction thereby being in a same single transactional context within the database, wherein upon the transaction being committed to the database, the message is also processed because the transaction and message are in the same single transactional context within the database.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for coordinating among a plurality of micro-services of a web service comprising:
   providing a plugin to a first micro-service of the plurality of micro-services, the first micro-service comprising an existing database, local to the first micro-service, for storing data corresponding to transactions received by the first micro-service and applied to the existing database;
   creating, by the plugin, a schema in the existing database for storing messages generated by the first microservice to inform a second micro-service of the transactions after the transactions are committed, wherein the second micro-service is another micro-service of the plurality of micro-services that is listening on a message bus for the messages;

receiving, by the first micro-service, a single request from an application for a transaction to be performed by the first micro-service, the transaction comprising one or more SQL actions to be committed to the existing database, the one or more SQL actions being defined in the single request from the application;

receiving, by the plugin, a message generated by the first micro-service to inform the second micro-service of the transaction, the second microservice being different from the application;

adding, by the plugin, the message to the transaction to form a combined transaction that allows the one or more SQL actions of the transaction and the message to be processed in a same single atomic transaction, wherein either all of the one or more SQL actions and the message are committed or none of the one or more SQL actions and the message are committed; and upon adding the message to the transaction, committing the combined transaction to the existing database having the schema created by the plugin for storing the message, the committing of the combined transaction thereby causing the message to be committed along with each of the one or more SQL actions in the transaction, the message and the transaction thereby being in a same single transactional context within the existing database, wherein after the transaction is committed to the existing database, the message is transmitted to the message bus with the committing of the transaction because the transaction comprising the one or more SQL actions and the message are in the same single transactional context, the message thereby not being transmitted unless the transaction from the combined transaction is also committed.

2. The method of claim 1 wherein the committing the combined transaction comprises storing the message and metadata associated with the message in a table provided by the schema.

3. The method of claim 1 wherein the combined transaction to be committed to the existing database and the message are assigned the same transaction identifier.

4. The method of claim 1 comprising adding to the combined transaction an operation to process the message.

5. The method of claim 1 wherein if the combined transaction is not committed to the existing database, the message is also not transmitted because the transaction and the message are in the same single transactional context within the existing database.

6. The method of claim 1 wherein the committing the combined transaction comprises passing the message to the message bus.

7. The method of claim 1 wherein the message generated by the first micro-service is to indicate to the second micro-service a completion of the transaction.

8. A system for a highly scalable and consistent pluggable messaging system on top of a database to coordinate communications among a plurality of micro-services of a web service, the system comprising:

a processor-based system executed on a computer system and configured to:

provide a plugin to a first micro-service of the plurality of micro-services, the first micro-service comprising the database for storing data corresponding to transactions received by the first micro-service and applied to the database;

create, by the plugin, a schema in the database for storing messages generated by the service to inform a second micro-service of the plurality of micro-services of the transactions after the transactions are committed;

receive, by the first micro-service, a single request from an application for a transaction to be performed by the first micro-service, the transaction comprising one or more SQL actions to be committed to the database, the one or more SQL actions being defined in the single request from the application;

receive, by the plugin, a message generated by the first micro-service to inform the second micro-service of the transaction after the transaction is committed, the second micro-service being different from the application;

add, by the plugin, the message to the transaction to form a combined transaction; and upon the addition of the message to the transaction, commit the combined transaction to the database having the schema created by the plugin for storing the message, wherein the commit of the combined transaction causes the message to be committed along with each of the one or more SQL actions in the transaction, and the message to be passed to a message bus to inform the second micro-service of the commitment of the transaction, the message and the transaction thereby being in a same single transactional context within the database.

9. The system of claim 8 wherein the commit of the combined transaction comprises storage of the message and metadata associated with the message in a table provided by the schema.

10. The system of claim 8 wherein the combined transaction to be committed to the database and the message are assigned the same transaction identifier.

11. The system of claim 8 wherein the processor-based system is configured to add to the combined transaction an operation to process the message.

12. The system of claim 8 wherein if the combined transaction is not committed to the database, the message is also not passed to the message bus because the transaction and the message are in the same single transactional context within the database.

13. A computer program product, comprising a non-transitory computer-readable medium having a computer-readable program code embodied therein, the computer-readable program code adapted to be executed by one or more processors to implement a method comprising:

providing a plugin to a first micro-service of a web service, the first micro-service comprising an existing database for storing data corresponding to transactions received by the first micro-service and applied to the existing database;

creating, by the plugin, a schema in the existing database for storing messages generated by the first micro-service to inform a second micro-service of the transactions after the transactions are committed, wherein the second micro-service is another micro-service of the web service;

receiving, by the first micro-service, a single request from an application for a transaction to be performed by the first micro-service, the transaction comprising one or more SQL actions to be committed to the existing database, the one or more SQL actions being defined in the single request from the application;

receiving, by the plugin, a message generated by the first micro-service that is to be transmitted to the second micro-service when the transaction is committed to the database to inform the second micro-service of the transaction, the second micro-service being different from the application;

adding, by the plugin, the message to the transaction to form a combined transaction; and upon the adding, committing the combined transaction having the message to the existing database having the schema created by the plugin, wherein the committing of the combined transaction causes the message to be committed along with each of the one or more SQL actions in the combined transaction, and wherein the committing of the combined transaction is accompanied by passing the message to a message bus to allow the second micro-service to receive the message, the message thereby not being transmitted unless and until the transaction from the combined transaction is also committed.

14. The computer program product of claim 13 wherein committing the combined transaction comprises storing the message and metadata associated with the message in a table provided by the schema.

15. The computer program product of claim 13 wherein the combined transaction to be committed to the existing database and the message are assigned the same transaction identifier.

16. The computer program product of claim 13 wherein the method comprises adding to the combined transaction an operation to process the message.

17. The computer program product of claim 13 wherein if the combined transaction is not committed to the database, the message is also not passed to the message bus because the transaction and the message are in the same single transactional context within the database.

* * * * *